Aug. 4, 1931.　　　H. F. ELLIOTT　　　1,817,355
VACUUM TUBE MOUNTING
Filed May 24, 1926　　　2 Sheets-Sheet 1

INVENTOR
Harold F. Elliott
BY John Flam
HIS ATTORNEY

Aug. 4, 1931.  H. F. ELLIOTT  1,817,355

VACUUM TUBE MOUNTING

Filed May 24, 1926  2 Sheets-Sheet 2

INVENTOR
Harold F. Elliott
BY
John Flam
HIS ATTORNEY

Patented Aug. 4, 1931

1,817,355

UNITED STATES PATENT OFFICE

HAROLD F. ELLIOTT, OF PALO ALTO, CALIFORNIA, ASSIGNOR, BY DIRECT AND MESNE ASSIGNMENTS, TO VICTOR TALKING MACHINE COMPANY, OF CAMDEN, NEW JERSEY, A CORPORATION OF NEW JERSEY

VACUUM TUBE MOUNTING

Application filed May 24, 1926. Serial No. 111,296.

This invention relates to vacuum tubes, and especially to a scheme for mounting them on a support.

In high frequency circuits utilizing such vacuum tubes, every precaution must be taken to prevent undesired oscillations. One of the causes of disturbances in the circuits may be the mechanical vibrations that the tubes are subjected to; for these tubes have delicately adjusted electrodes which are sensitive to such vibrations. In order to prevent this, it has been proposed in the past to mount the tubes on resilient pads or bases, such as sponge rubber. This mode of mounting is however usually expensive and inconvenient.

It is accordingly one of the objects of my invention to provide a simple, convenient and inexpensive mounting for vacuum tubes that buffs the mechanical jarring or vibrations.

My invention possesses many other advantages, and has other objects which may be made more easily apparent from a consideration of one embodiment of my invention. For this purpose I have shown a few forms in the drawings accompanying and forming part of the present specification. I shall now proceed to describe these forms in detail, which illustrate the general principles of my invention; but it is to be understood that this detailed description is not to be taken in a limiting sense, since the scope of my invention is best defined by the appended claims.

Referring to the drawings.

Figure 1:
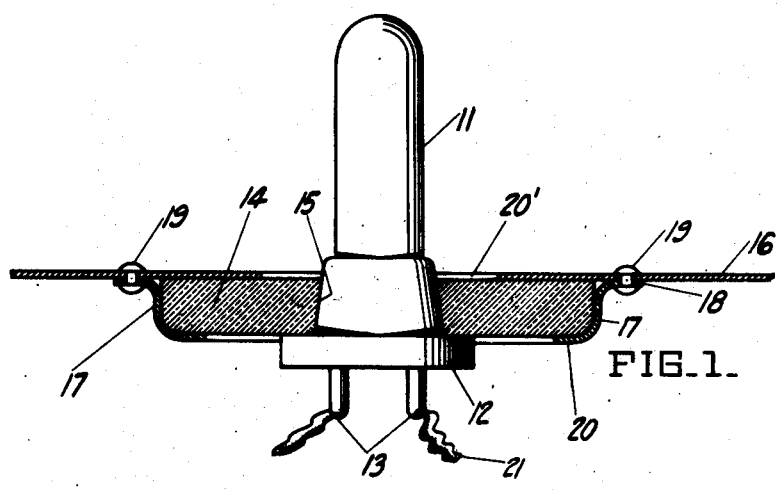
Figure 1 is a view in section, of a tube mounting, and showing the tube and its associated parts, on the mounting.
Figure 2:
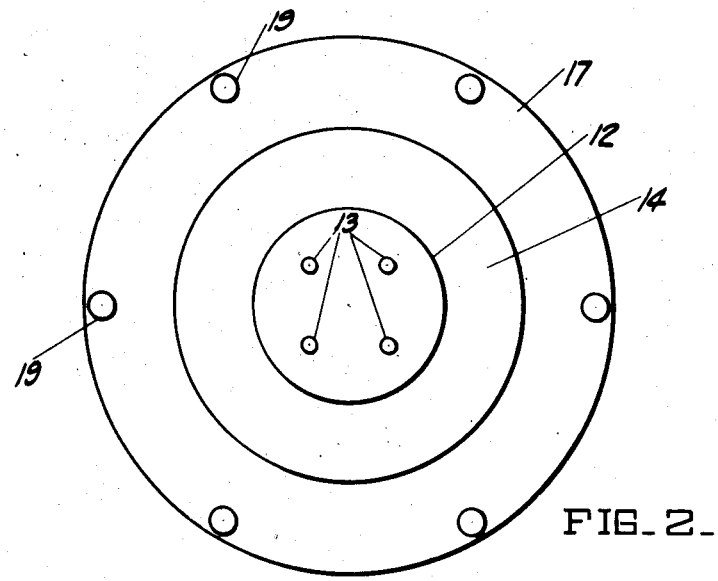
Figure 2 is a bottom plan view thereof.

In the forms shown in Figs. 1 and 2, the tube 11 is shown as having a socket 12 of conventional design; in this instance, circular. Electrode prongs 13 extend externally of the socket 12, to which prongs are connected, as by soldering the wires or leads 21. In order to hold the socket in place, a resilient pad or support 14 is used, having an aperture 15 in which the socket 12 can be tightly gripped. The pad 14 can be made from soft rubber or sponge rubber, or the like. Since almost all sockets have a tapered exterior, it is an easy matter so to proportion the size of the aperture 15 that the socket 12 can be urged tightly into the aperture and held resiliently therein. The member 14 is in turn supported at its edges on a main supporting partition 16, as by the aid of a ring 17. This ring has a flange 18, permitting fastening devices, such as rivets 19, to hold the ring in place. It also has another flange 20 which engages the bottom surface of pad 14 to hold it in place. Furthermore, in order to give as much freedom to the central, supporting portion of pad 14 as possible, the support 16 is provided with a large aperture 20' whereby the pad 14 is confined only adjacent its edges.

It is evident that the arrangement can be multiplied to provide a resilient support for as many tubes 11 as desired, by the provision of additional apertures such as 15, or additional pads 14.

Figure 3:
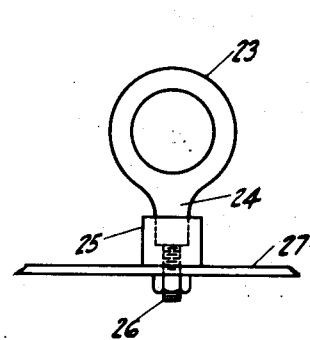
Fig. 3 is an end view of a modified form of tube mounting.
Figure 4:
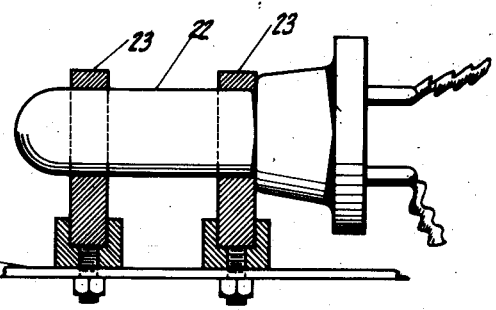
Fig. 4 is a sectional view of the said modification.

The principal idea in this form of mounting is to provide a resilient gripping device for the tube assembly; and of course it is immaterial whether the socket 12 is gripped or the tube inserted therein. Thus for example I show in Figs. 3 and 4, a tube 22 which is resiliently gripped by one or more rings 23, made from soft rubber or like material. Each of these rings has a projection 24 or its equivalent, gripped or fastened to a U-shaped support 25. This support in turn can be fastened as by a screw 26, to a supporting panel 27.

Figure 5:
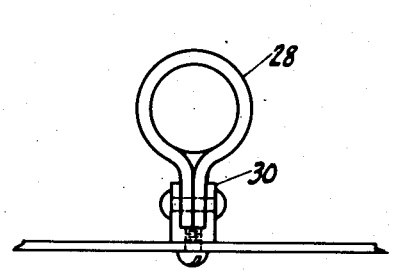
Figs. 5 and 6 are similar views of a further modification.
Figure 6:
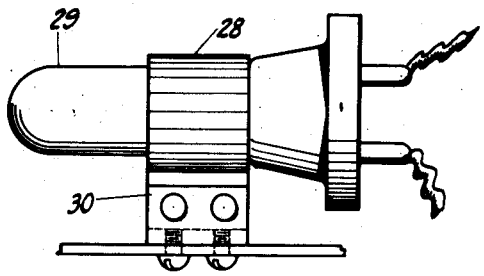

A still further modification is illustrated in Figs. 5 and 6. In this form, one wide ring 28 is utilized for resiliently gripping the tube 29. This ring may, as before, be made from soft rubber or the like. It can conveniently be formed from a flat strip of rubber, looped around and riveted together at its ends to a U-shaped support 30, similar to support 25.

In all of the modifications, a resilient ring is used for frictionally engaging either the socket or the tube. Thus the socket or tube can be readily inserted or withdrawn from its support, while it is insured that it will be tightly gripped when in use.

I claim:

1. In combination, a vacuum tube socket, a soft, resilient member having a large aperture adapted to engage around an exterior surface of the socket and grip it frictionally, said surface being coaxial with the socket axis, and means for supporting the member.

2. In combination, a vacuum tube socket, a thick soft rubber member having a large aperture for frictionally gripping an exterior surface of the socket, said surface being coaxial with the socket axis, and means for supporting said member adjacent its edges.

3. In combination, a vacuum tube socket, a thick soft rubber member having an aperture for frictionally gripping an exterior surface of the socket, a flanged ring engaging said member adjacent the edge thereof, and a supporting member between which and the ring, the soft rubber member is held.

4. In combination, a vacuum tube and socket assembly having an exterior surface concentric with the axis of said assembly, a soft resilient member having a large aperture adapted to engage around said exterior surface and to grip it frictionally, and means for supporting said member.

5. A resilient mounting means for a vacuum tube and socket assembly including in combination a mounting pad for said assembly and a support for said pad, said pad having a central aperture for receiving said assembly and being of a resilient material adapted to grip an exterior surface and resiliently hold said assembly, and means for securing said pad to said support.

In testimony whereof I have hereunto set my hand.

HAROLD F. ELLIOTT.